United States Patent
Tsai

(10) Patent No.: US 12,491,567 B2
(45) Date of Patent: Dec. 9, 2025

(54) HAND TOOL HOLDING STRUCTURE

(71) Applicant: Chang-Yu Tsai, Taichung (TW)

(72) Inventor: Chang-Yu Tsai, Taichung (TW)

( * ) Notice: Subject to any disclaimer, the term of this patent is extended or adjusted under 35 U.S.C. 154(b) by 562 days.

(21) Appl. No.: 18/171,828

(22) Filed: Feb. 21, 2023

(65) Prior Publication Data
US 2024/0278395 A1 Aug. 22, 2024

(51) Int. Cl.
| | | |
|---|---|---|
| *B23B 31/107* | (2006.01) | |
| *B23B 31/12* | (2006.01) | |
| *B25B 15/04* | (2006.01) | |
| *B25B 23/00* | (2006.01) | |

(52) U.S. Cl.
CPC ........ *B23B 31/1078* (2013.01); *B23B 31/107* (2013.01); *B23B 31/1215* (2013.01); *B25B 15/04* (2013.01); *B25B 23/0035* (2013.01); *B23B 2231/58* (2021.01)

(58) Field of Classification Search
CPC .............. B23B 31/1078; B23B 31/107; B23B 31/1253; B23B 2231/58; B23B 2231/32; B23B 2231/38; B25B 15/04; B25B 23/0035; B25B 23/0007
USPC ..................................................... 279/28, 60
See application file for complete search history.

(56) References Cited

U.S. PATENT DOCUMENTS

| | | | |
|---|---|---|---|
| 9,902,050 B2 | 2/2018 | Tsai | |
| 2007/0228672 A1* | 10/2007 | Huang | ................ B23B 31/1253 |
| | | | 279/58 |
| 2016/0346845 A1* | 12/2016 | Homola | ............. B23B 31/1071 |

FOREIGN PATENT DOCUMENTS

TW M520438 U 4/2016

* cited by examiner

*Primary Examiner* — Alan Snyder
(74) *Attorney, Agent, or Firm* — LANWAY IPR SERVICES; Chun-Ming Shih

(57) ABSTRACT

A hand tool holding structure includes a first body, a second body, multiple third bodies, a fourth body, an elastic member, and a fifth body. The first body has a first pivot portion, a second pivot portion, a mounting portion, multiple first receiving slots, a first abutting edge, and a second abutting edge. The second body has a second receiving slot, a first abutting portion, a third receiving slot, and a second abutting portion. Each of the third bodies has a locking portion, a first inclined plane, an abutting face, a second inclined plane, and a third abutting portion. The fourth body has a fourth receiving slot, a fifth receiving slot, and a third inclined plane. The elastic member is mounted on the second pivot portion and biased between the second abutting edge and the second abutting portion. The fifth body is mounted on the first body.

10 Claims, 12 Drawing Sheets

B-B

HAND TOOL HOLDING STRUCTURE

BACKGROUND OF THE INVENTION

1. Field of the Invention

The present invention relates to a holding or positioning structure and, more particularly, to a hand tool holding structure or chuck.

2. Description of the Related Art

A conventional positioning device for a hand tool was disclosed in the U.S. Pat. No. 9,902,050 (or Taiwanese Patent Publication No. M520438), and is used to mount multiple bits 81. Thus, the positioning device is available for magnetically attracting the bits 81 of a single specification. However, when the bits 81 have different specifications, the user will have to purchase multiple positioning devices for holding the bits 81 of different specifications, thereby causing inconvenience to the user, and thereby increasing the working cost.

BRIEF SUMMARY OF THE INVENTION

In accordance with the present invention, there is provided a hand tool holding structure comprising a first body, a second body, multiple third bodies, a fourth body, an elastic member, and a fifth body. The first body is provided with a first pivot portion, a second pivot portion, a mounting portion, multiple first receiving slots, a first abutting edge, a first end, a second end, and a second abutting edge. The second body is provided with a second receiving slot, a first abutting portion, a third receiving slot, and a second abutting portion. Each of the third bodies is provided with a locking portion, a first inclined plane, a third end, an abutting face, a second inclined plane, and a third abutting portion. The fourth body is provided with a fourth receiving slot, a fifth receiving slot, and a third inclined plane. The elastic member is mounted on the second pivot portion and hidden in the third receiving slot. The elastic member is elastically biased between the second abutting edge and the second abutting portion. The fifth body is mounted on the first body.

According to the primary advantage of the present invention, each of the third bodies is received in one of the first receiving slots. Each of the third bodies is moved horizontally or moved upward and downward in an inclined manner between one of the first receiving slots and the third inclined plane. The drive member is clamped by the third bodies so that the hand tool holding structure is used to hold the drive member of different sizes and specifications, to facilitate the user operating the drive member, thereby enhancing the versatility of the hand tool holding structure.

According to another advantage of the present invention, when the drive member is fitted into the mounting portion of the first body, the drive member is clamped by the third bodies, so that the drive member is operated by the first body even if the size of the drive member is less than that of the mounting portion.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
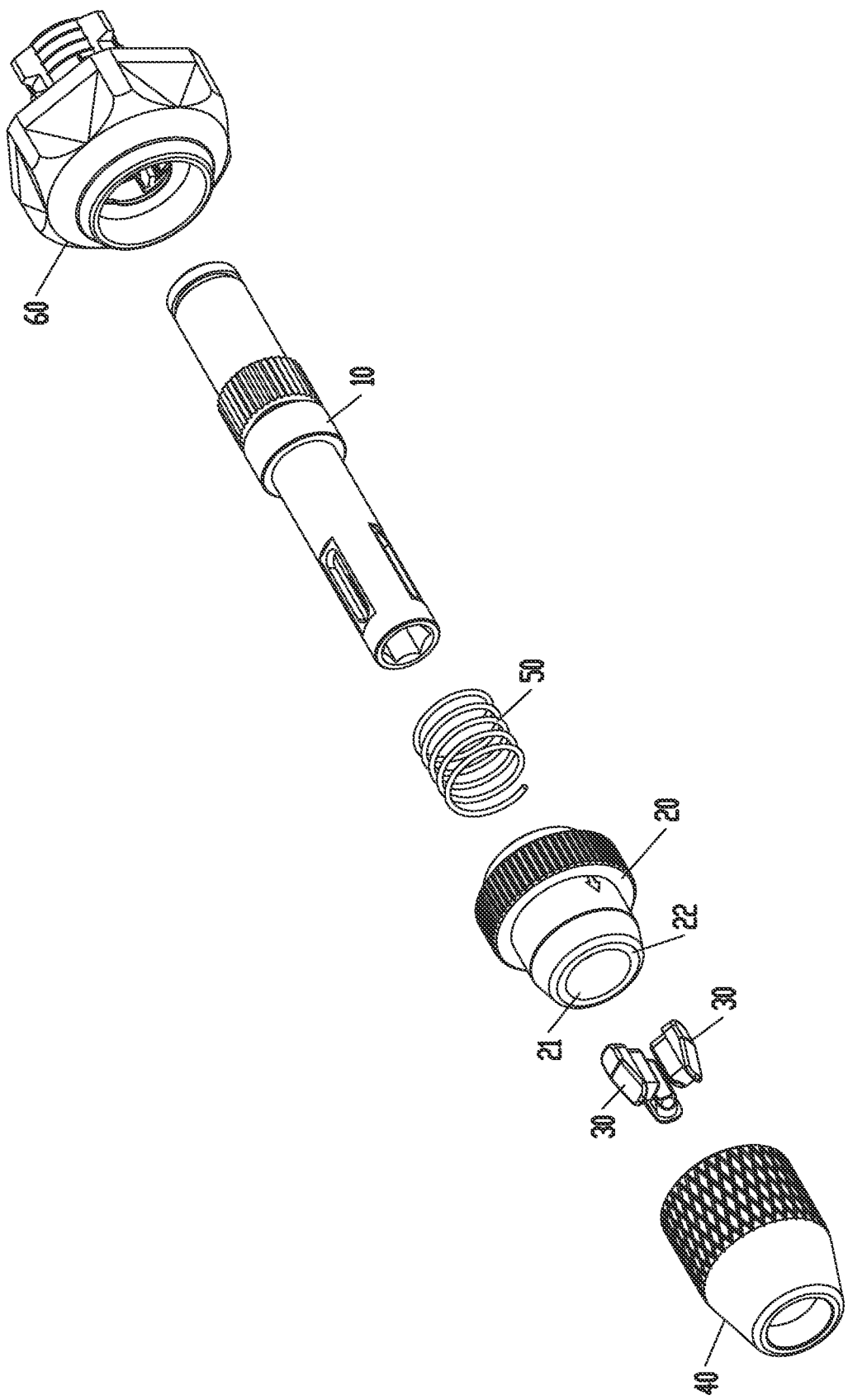
FIG. 1 is an exploded perspective view of a hand tool holding structure in accordance with the first preferred embodiment of the present invention.
Figure 2:
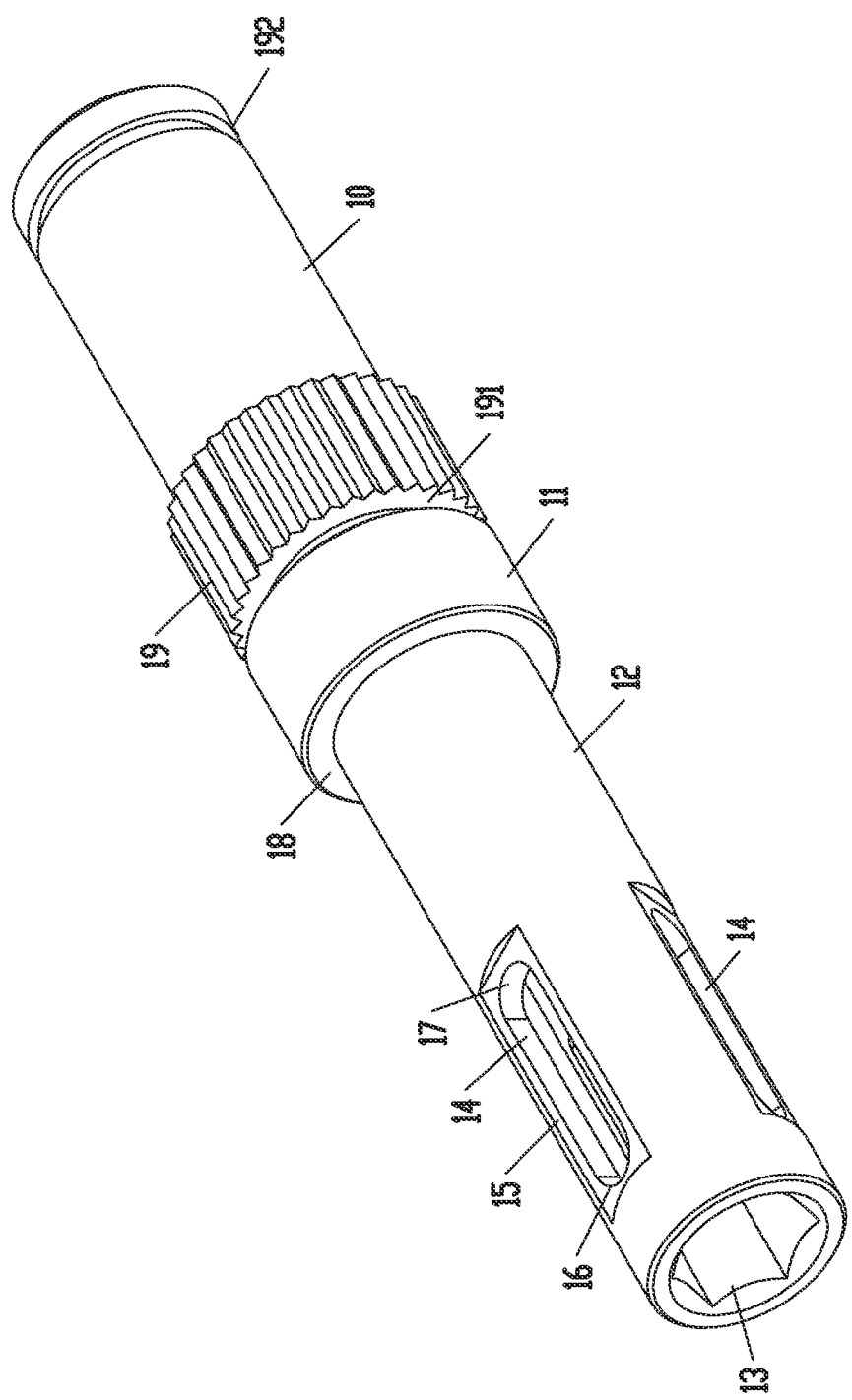
FIG. 2 is a perspective view of a first body of the hand tool holding structure of the present invention.
Figure 4:
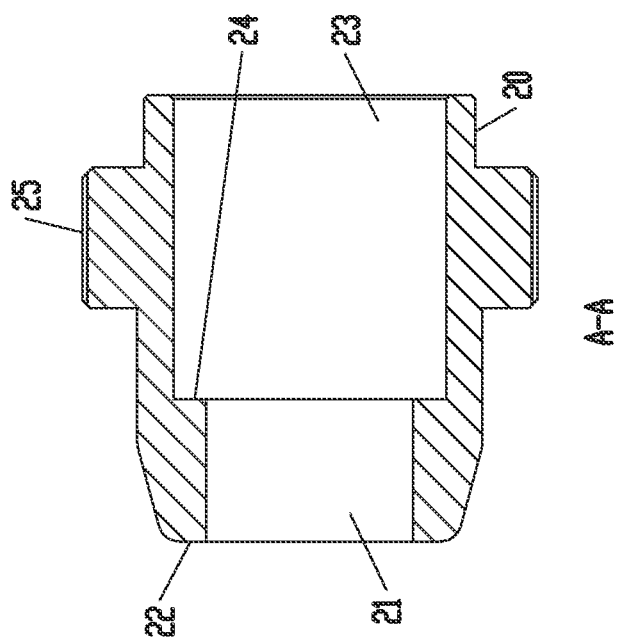
FIG. 4 is a cross-sectional view of the second body taken along line A-A as shown in FIG. 3.
Figure 3:
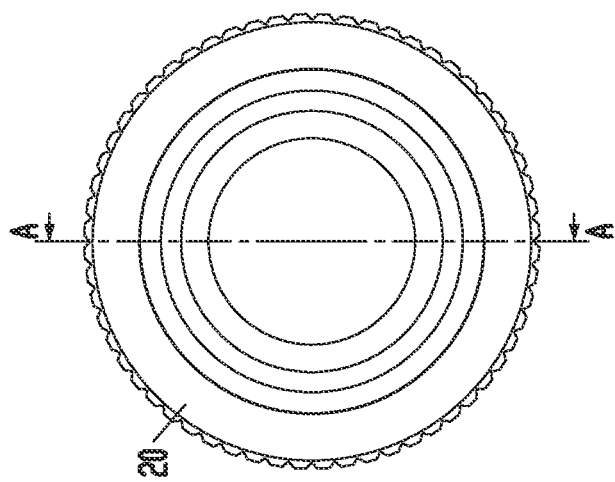
FIG. 3 is a front view of a second body of the hand tool holding structure of the present invention.
Figure 5:
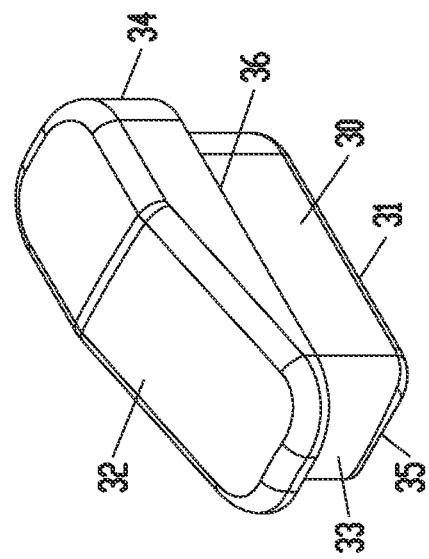
FIG. 5 is a perspective view of a third body of the hand tool holding structure of the present invention.
Figure 7:
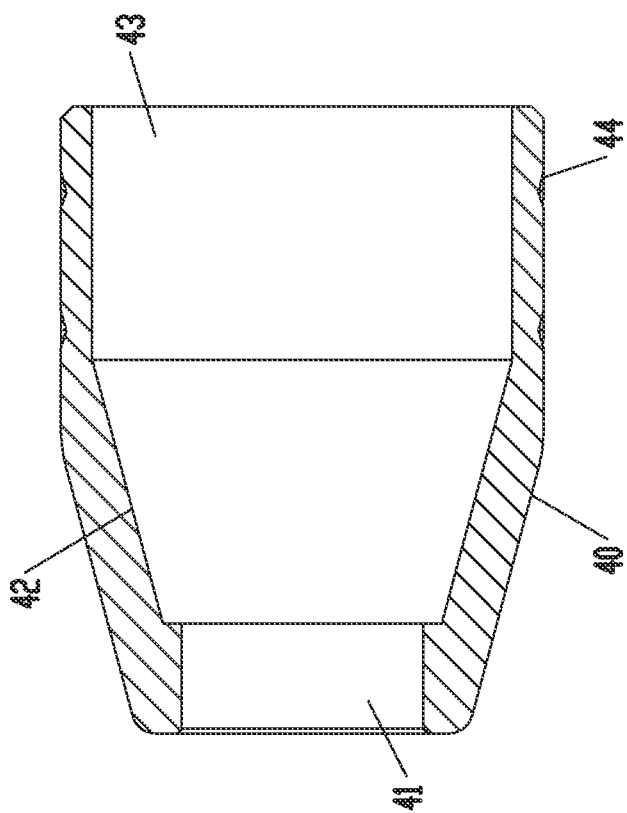
FIG. 7 is a cross-sectional view of the fourth body taken along line B-B as shown in FIG. 6.
Figure 6:
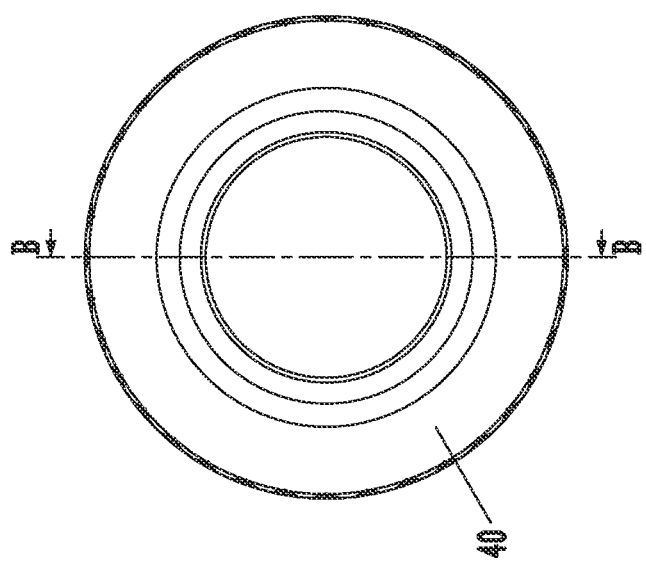
FIG. 6 is a front view of a fourth body of the hand tool holding structure of the present invention.

Referring to the drawings and initially to FIGS. 1-12, a hand tool holding structure in accordance with the preferred embodiment of the present invention comprises a first body 10, a drive member 70, a second body 20, multiple third bodies 30, a fourth body 40, an elastic member 50, and a fifth body 60.

The first body 10 is a circular rod. The first body 10 is provided with a first pivot portion 11. The first pivot portion 11 is situated at a mediate position of the first body 10. The first body 10 is provided with a second pivot portion 12. The first body 10 is provided with a mounting portion 13. The mounting portion 13 has a hexagonal shape. The second pivot portion 12 has a peripheral face provided with multiple first receiving slots 14. The first receiving slots 14 are connected to the mounting portion 13. Each of the first receiving slots 14 is provided with a first abutting edge 15. The first abutting edge 15 is situated at an opening of each of the first receiving slots 14. Each of the first receiving slots 14 is provided with a first end 16 and a second end 17. The first end 16 is close to the mounting portion 13. The first pivot portion 11 has a diameter more than that of the second pivot portion 12. The first body 10 is provided with a second abutting edge 18 located between the first pivot portion 11 and the second pivot portion 12.

The drive member 70 is mounted in the mounting portion 13. Preferably, the drive member 70 is a hexagonal screwdriver tip.

The second body 20 is pivotally connected with the first body 10. The second body 20 is movable on the first body 10 linearly. The second body 20 has a first end provided with a second receiving slot 21. The second receiving slot 21 has a diameter matching that of the second pivot portion 12. The first end of the second body 20 is provided with a first abutting portion 22. The second body 20 has a second end provided with a third receiving slot 23. The third receiving slot 23 has a diameter matching that of the first pivot portion 11. The third receiving slot 23 is connected to the second receiving slot 21. The second receiving slot 21 and the third receiving slot 23 penetrate the second body 20. The diameter of the third receiving slot 23 is more than that of the second receiving slot 21. The second body 20 is provided with a second abutting portion 24 located between the second receiving slot 21 and the third receiving slot 23.

The third bodies 30 have a number matching that of the first receiving slots 14. Each of the third bodies 30 is movably mounted in one of the first receiving slots 14. The third bodies 30 are moved in the first receiving slots 14 simultaneously. The third bodies 30 are arranged in an annular shape. Each of the third bodies 30 has a first side provided with a locking portion 31 received in one of the first receiving slots 14. The locking portions 31 of the third bodies 30 are directed toward each other. The locking portions 31 of the third bodies 30 are directed toward the mounting portion 13. The locking portions 31 of the third bodies 30 are moved toward each other or away from each other when the third bodies 30 are moved. Each of the third bodies 30 has a second side provided with a first inclined plane 32 protruding from one of the first receiving slots 14. Each of the third bodies 30 is provided with a third end 33 resting on the first end 16. Each of the third bodies 30 is provided with an abutting face 34 resting on the first abutting portion 22. The abutting face 34 is opposite to the third end 33. The locking portion 31 is provided with a second inclined plane 35 directed toward the mounting portion 13. The second inclined plane 35 and the third end 33 are located at the same side of each of the third bodies 30. Each of the third bodies 30 is provided with a third abutting portion 36 situated between the locking portion 31 and the first inclined plane 32. The third abutting portion 36 rests on the first abutting edge 15. The third abutting portion 36 is movable away from the first abutting edge 15.

The fourth body 40 has a first end provided with a fourth receiving slot 41 mounted on the second pivot portion 12. The fourth receiving slot 41 is closely fitted onto the second pivot portion 12. The fourth body 40 has a second end provided with a fifth receiving slot 43 mounted on the second body 20. The fourth body 40 is provided with a third inclined plane 42 located between the fourth receiving slot 41 and the fifth receiving slot 43. The third inclined plane 42 has a slope matching that of the first inclined plane 32. When each of the third bodies 30 is moved, the first inclined plane 32 rests on and is moved along the third inclined plane 42. The third inclined plane 42 has a minimum diameter more than a diameter of the fourth receiving slot 41. The third inclined plane 42 has a diameter increased gradually from the fourth receiving slot 41 toward the fifth receiving slot 43. The third inclined plane 42 is connected to the fourth receiving slot 41 and the fifth receiving slot 43. The third inclined plane 42 has a maximum diameter equal to a diameter of the fifth receiving slot 43. The fourth receiving slot 41, the third inclined plane 42, and the fifth receiving slot 43 in turn penetrate the fourth body 40.

The elastic member 50 is mounted on the second pivot portion 12 and hidden in the third receiving slot 23. The elastic member 50 is elastically biased between the second abutting edge 18 and the second abutting portion 24. When the second body 20 is pressed by an elastic force of the elastic member 50, each of the third bodies 30 is pushed by the second body 20, so that the first abutting portion 22 presses the abutting face 34, the third end 33 presses the first end 16, and the first inclined plane 32 is close to the third inclined plane 42.

The fifth body 60 is mounted on the first body 10. The fifth body 60 drives and rotates the first body 10.

In the preferred embodiment of the present invention, each of the first receiving slots 14 has an elongate shape. The second pivot portion 12 has three first receiving slots 14 arranged in annular shape. The first abutting edge 15 surrounds each of the first receiving slots 14. The first abutting edge 15 has a planar shape. Each of the first end 16 and the second end 17 has an arcuate shape.

In the preferred embodiment of the present invention, the first body 10 is provided with a gear portion (or driven block) 19. The gear portion 19 includes multiple teeth arranged in an annular shape. An interval is defined between the gear portion 19 and the first pivot portion 11. The first body 10 is provided with a third abutting edge 191 located between the first pivot portion 11 and the gear portion 19. The first body 10 is provided with an annular groove 192 distal to the first pivot portion 11.

The fifth body 60 has a reversible rotation function and drives the first body 10 to rotate reversibly. The fifth body 60 includes diverse reversible rotation structures. The fifth body 60 is mounted on the gear portion 19.

In the preferred embodiment of the present invention, the second body 20 has an outer peripheral face provided with a push displacement portion 25. The push displacement portion 25 has an annular toothed shape. The push displacement portion 25 has a diameter more than that of the second body 20.

In the preferred embodiment of the present invention, the third abutting portion 36 has a planar shape.

In the preferred embodiment of the present invention, the fourth body 40 has a conic cylindrical shape.

Figure 8:
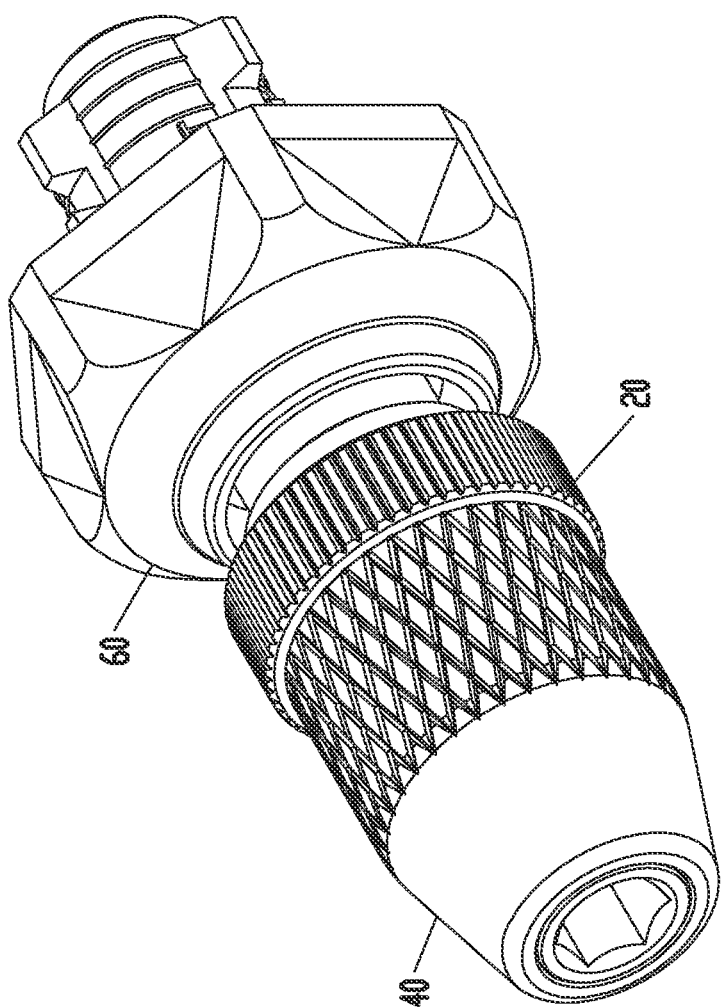
FIG. 8 is a perspective assembly view of the hand tool holding structure as shown in FIG. 1.
Figure 9:
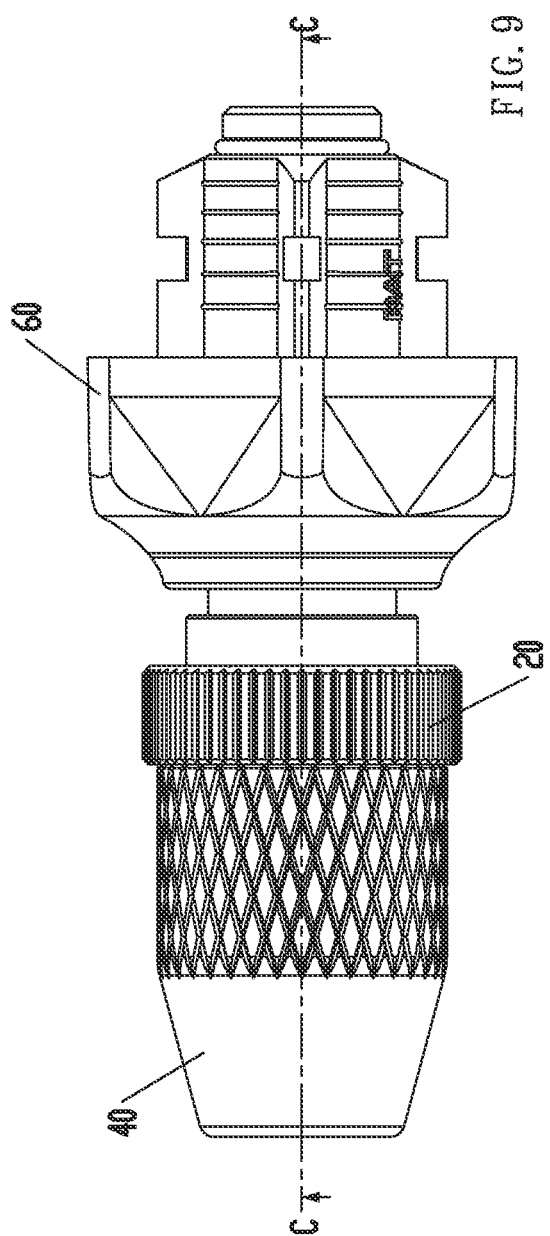
FIG. 9 is a side view of the hand tool holding structure as shown in FIG. 8.
Figure 10:
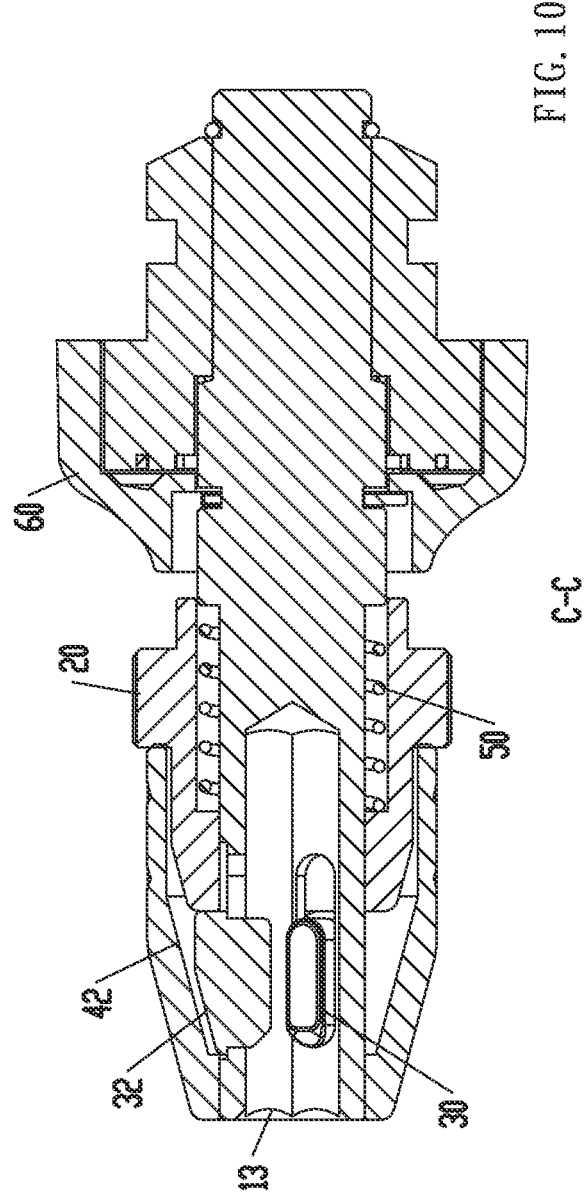
FIG. 10 is a cross-sectional view of the hand tool holding structure taken along line C-C as shown in FIG. 9.

In assembly, referring to FIGS. 8-10 with reference to FIGS. 1-7, the second body 20 is pivotally mounted on the second pivot portion 12 of the first body 10. The locking portion 31 of each of the third bodies 30 is received in one of the first receiving slots 14 of the first body 10. The third abutting portion 36 of each of the third bodies 30 rests on the first abutting edge 15 of the first body 10. The first inclined plane 32 of each of the third bodies 30 protrudes from the first abutting edge 15 of the first body 10. The abutting face 34 of each of the third bodies 30 rests on the first abutting portion 22 of the second body 20. The fourth receiving slot 41 of the fourth body 40 is pivotally mounted on the second pivot portion 12 of the first body 10. The fifth receiving slot 43 of the fourth body 40 is mounted on the second body 20. The third inclined plane 42 of the fourth body 40 faces and aligns with the first inclined plane 32 of each of the third bodies 30. The elastic member 50 is mounted on the second pivot portion 12 of the first body 10 and hidden in the third receiving slot 23 of the second body 20. The elastic member 50 is elastically biased between the second abutting edge 18 of the first body 10 and the second abutting portion 24 of the second body 20. The fifth body 60 is mounted on the gear portion 19 of the first body 10.

Figure 11:
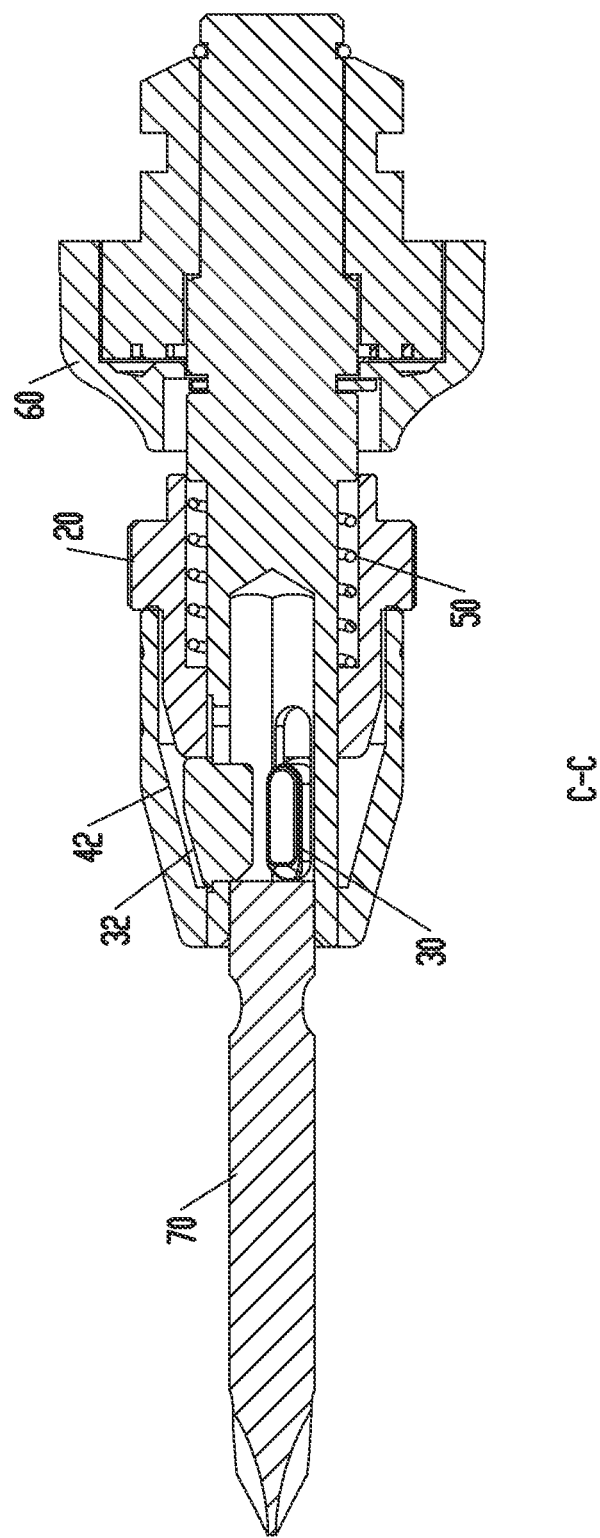
FIG. 11 is a schematic operational view of the hand tool holding structure as shown in FIG. 10.
Figure 12:
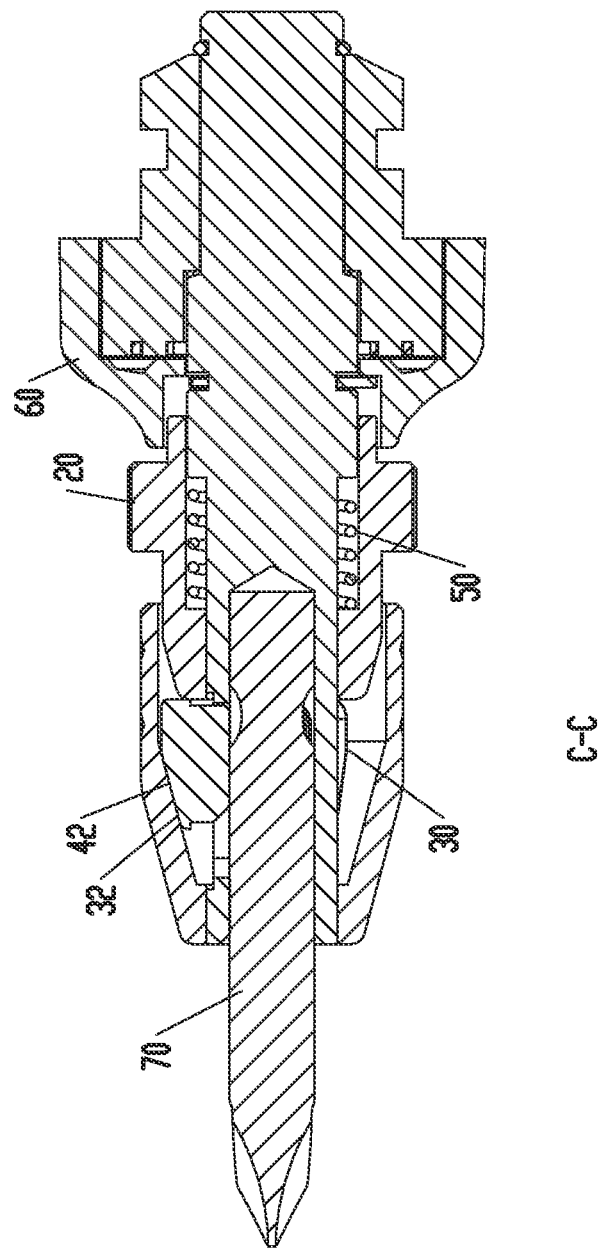
FIG. 12 is a schematic operational view of the hand tool holding structure as shown in FIG. 11.

In operation, referring to FIGS. 11 and 12 with reference to FIGS. 1-10, when the drive member 70 is inserted into the mounting portion 13 of the first body 10, the second inclined plane 35 of each of the third bodies 30 is pressed by the drive member 70, so that each of the third bodies 30 is pushed to move backward. Then, the abutting face 34 of each of the third bodies 30 pushes the first abutting portion 22 of the second body 20, so that the second body 20 is pushed backward, and the elastic member 50 is compressed. In such a manner, the first inclined plane 32 of each of the third bodies 30 is moved upward along the third inclined plane 42 of the fourth body 40, the third end 33 of each of the third bodies 30 is moved away from the first end 16 of the first body 10, the third abutting portion 36 of each of the third bodies 30 is moved away from the first abutting edge 15 of the first body 10, each of the third bodies 30 is moved toward the second end 17 of the first body 10, and the third bodies 30 are moved away from each other. Thus, the drive member 70 is fitted into the mounting portion 13 of the first body 10. At this time, the locking portion 31 of each of the third bodies 30 is restricted by the elastic force of the elastic member 50, so that the first inclined plane 32 of each of the third bodies 30 presses the third inclined plane 42 of the fourth body 40, and the locking portion 31 of each of the third bodies 30 is locked onto the drive member 70. Thus, the drive member 70 is clamped by the locking portion 31 of each of the third bodies 30 so that the drive member 70 is secured in the mounting portion 13 of the first body 10. Then, the first body 10 is driven by the fifth body 60 to rotate the drive member 70.

Figure 13:
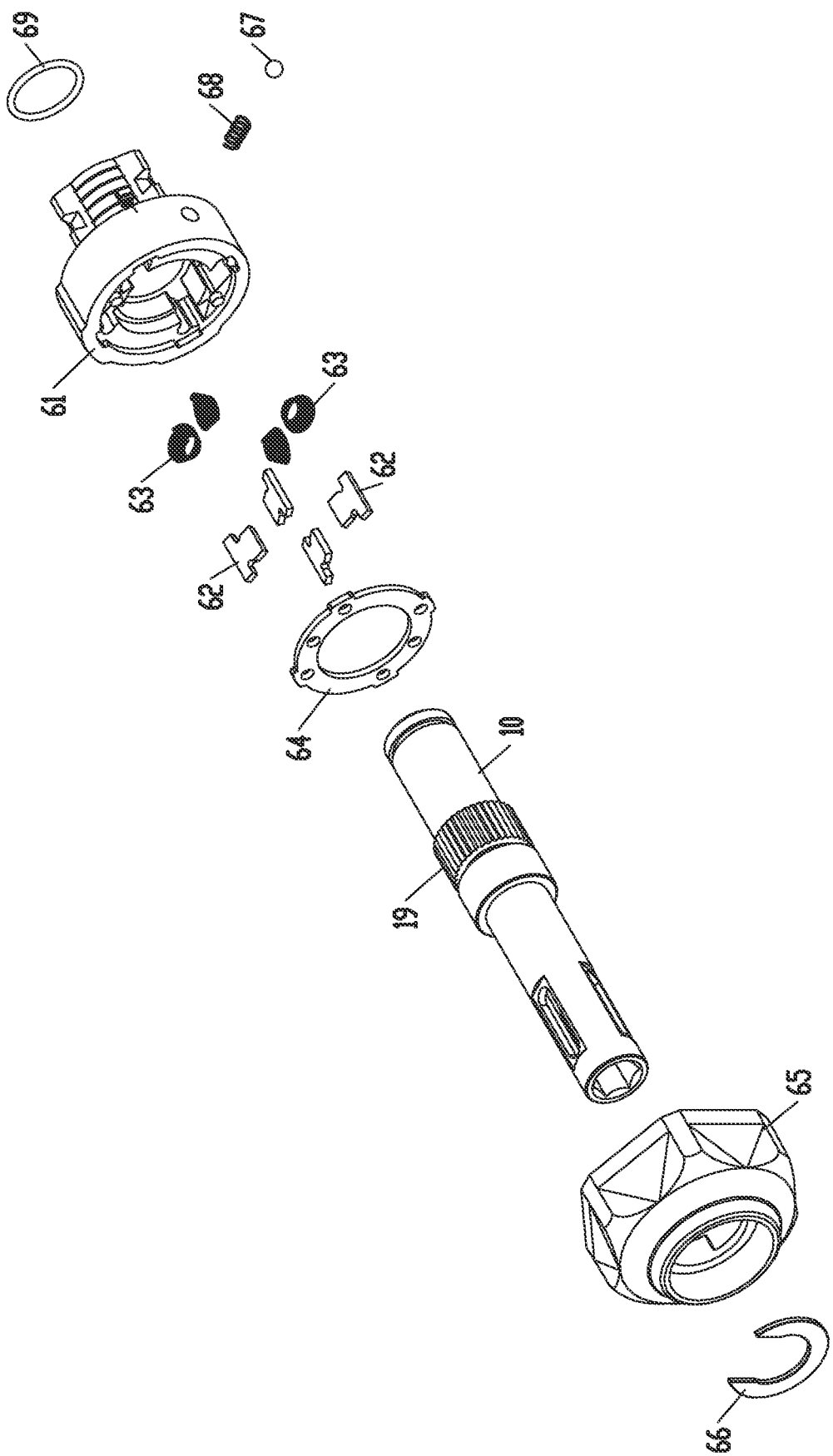
FIG. 13 is an exploded perspective view of a hand tool holding structure in accordance with the second preferred embodiment of the present invention.

Referring to FIG. 13 with reference to FIGS. 1-7, the fifth body 60 is a reversible rotation module as disclosed in the U.S. Pat. No. 9,278,435, and comprises a housing 61, multiple locking pieces 62, multiple first elastomers 63, a fixed plate 64, a control member 65, a snap-fit plate 66, a ball 67, a second elastomer 68, and a ring 69.

The housing 61 is mounted on the first body 10. The locking pieces 62 and the first elastomers 63 are received in the housing 61. The locking pieces 62 are pressed by the elastic force of the first elastomers 63 and locked on the gear portion 19. The locking pieces 62 have a number equal to that of the first elastomers 63. The fixed plate 64 is assembled with the housing 61. The control member 65 is assembled with the housing 61. The control member 65 is rotated to control a normal direction and a reverse direction of rotation of the fifth body 60. The snap-fit plate 66 is snapped onto the third abutting edge 191. The ball 67 and the second elastomer 68 are mounted on the housing 61. The ring 69 is mounted on the housing 61 and retained in the annular groove 192.

Figure 14:
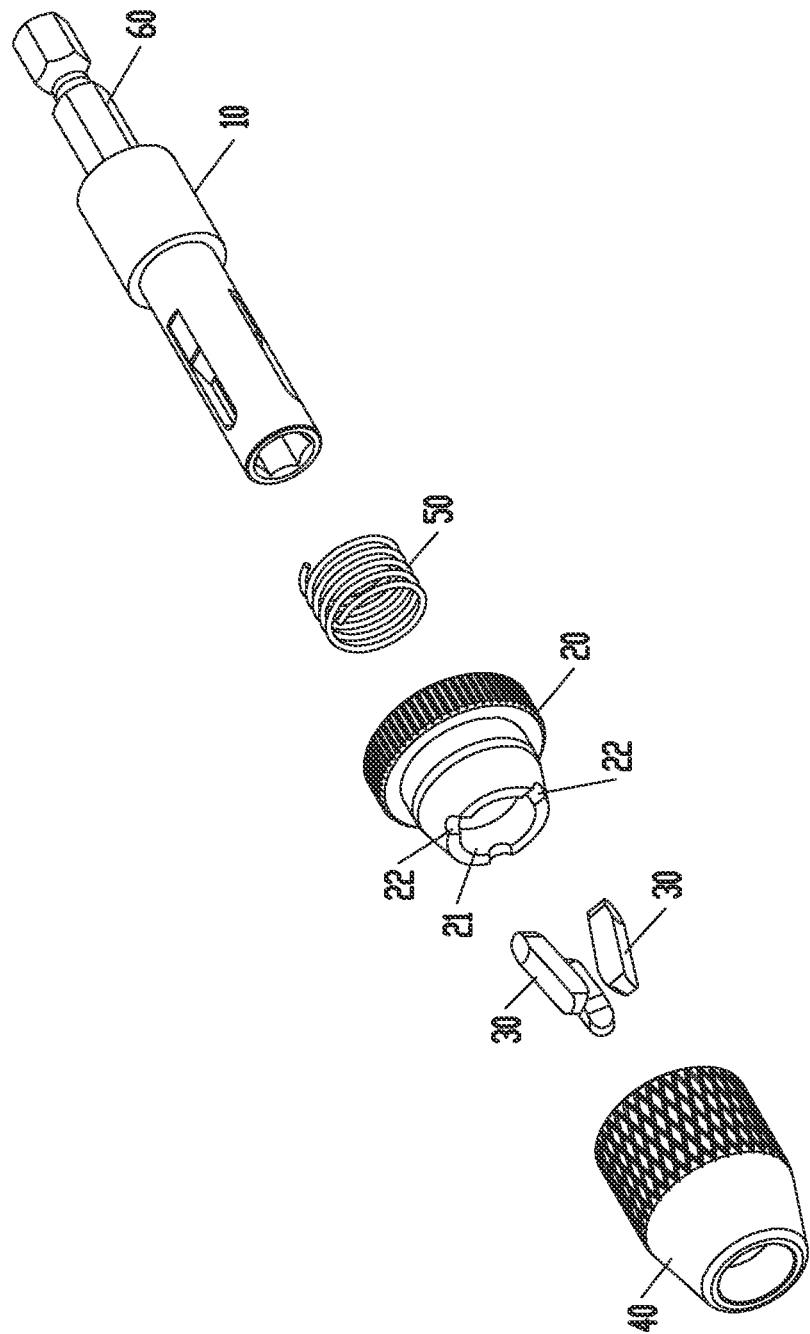
FIG. 14 is an exploded perspective view of a hand tool holding structure in accordance with the third preferred embodiment of the present invention.

Referring to FIG. 14, the first end of the second body 20 is provided with multiple first abutting portions 22. Each of the first abutting portions 22 is a recess. The first abutting portions 22 have a number equal to that of the third bodies 30. Each of the third bodies 30 is partially received in one of the first abutting portions 22. The fifth body 60 and the first body 10 are formed integrally. The fifth body 60 is a hexagonal shank.

Figure 15:
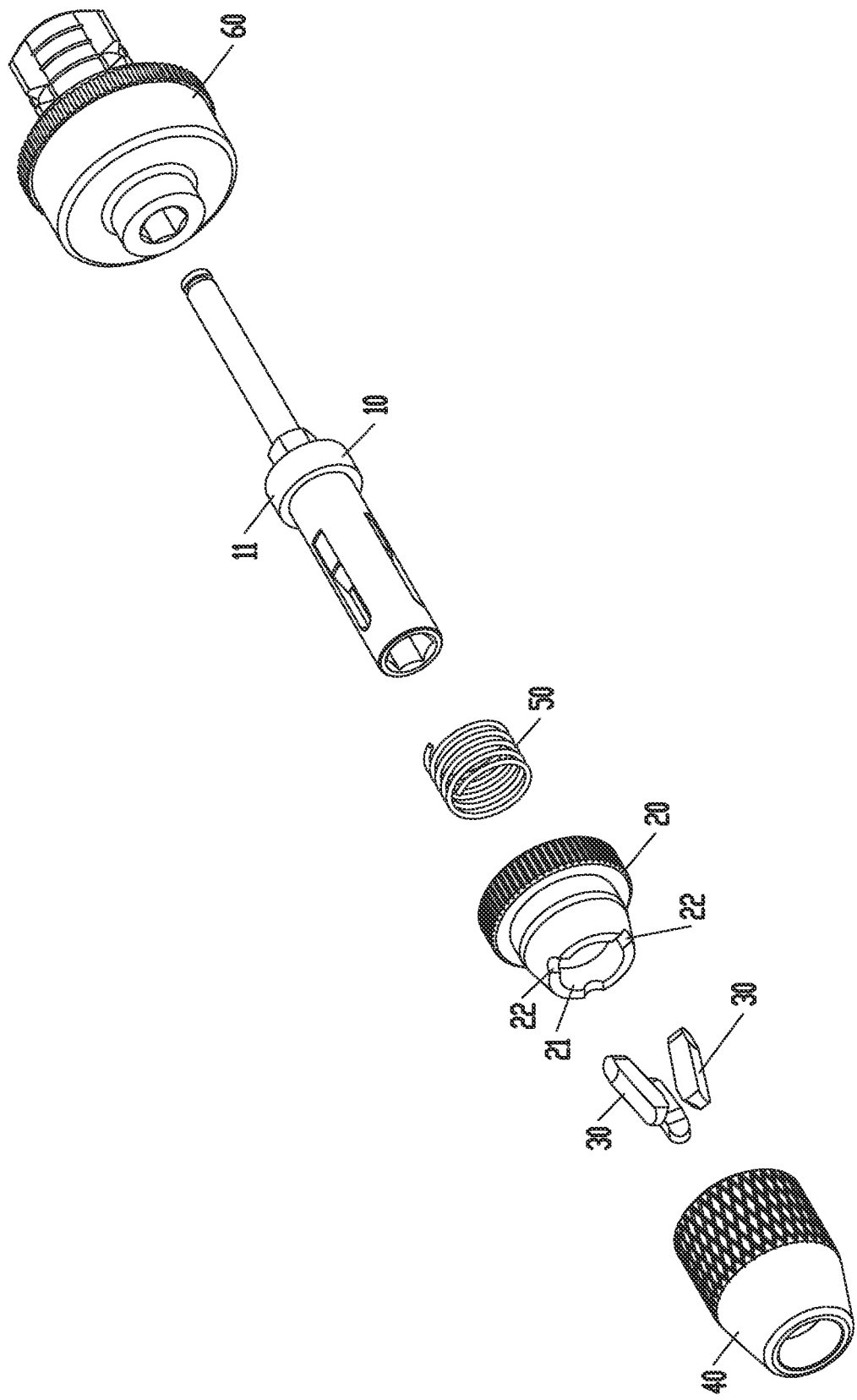
FIG. 15 is an exploded perspective view of a hand tool holding structure in accordance with the fourth preferred embodiment of the present invention.
Figure 16:
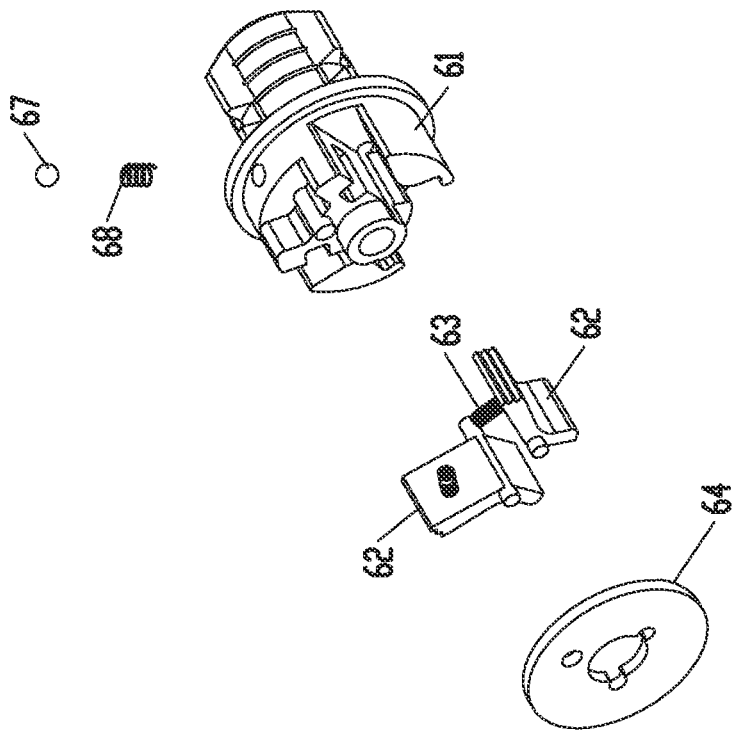
FIG. 16 is an exploded perspective view of a fifth body of the hand tool holding structure as shown in FIG. 15.
Figure 17:
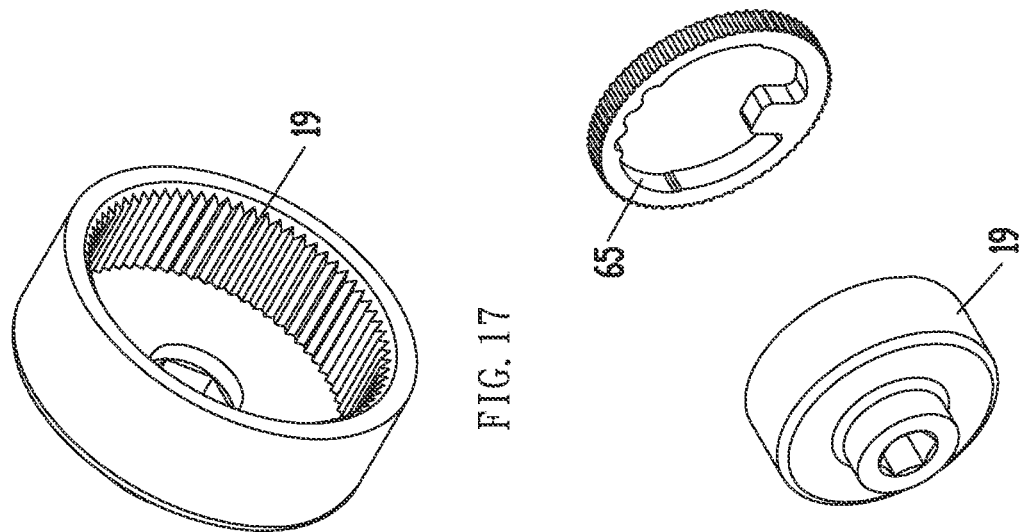
FIG. 17 is a perspective view of a gear portion of the hand tool holding structure as shown in FIG. 16.

Referring to FIGS. 15-17, the fifth body 60 is a reversible rotation module as disclosed in the U.S. Pat. No. 10,766,125. The fifth body 60 is applied for the gear portion 19. The gear portion 19 is an individual member having an internal annular toothed structure. In comparison, referring to FIG. 13 again, the fifth body 60 is applied for the gear portion 19 having an external annular toothed structure.

In another preferred embodiment of the present invention, the fifth body 60 is a handgrip mounted on the first body 10. Thus, the user holds the fifth body 60 to drive and rotate the first body 10.

Accordingly, the hand tool holding structure in accordance with the present invention has the following advantages.

1. Each of the third bodies 30 is received in one of the first receiving slots 14. Each of the third bodies 30 is moved horizontally or moved upward and downward in an inclined manner between one of the first receiving slots 14 and the third inclined plane 42. The drive member 70 is clamped by the third bodies 30 so that the hand tool holding structure is used to hold the drive member 70 of different sizes and specifications, to facilitate the user operating the drive member 70, thereby enhancing the versatility of the hand tool holding structure.

2. When the drive member 70 is fitted into the mounting portion 13 of the first body 10, the drive member 70 is clamped by the third bodies 30, so that the drive member 70 is operated by the first body 10 even if the size of the drive member 70 is less than that of the mounting portion 13.

3. The first inclined plane 32 of each of the third bodies 30 presses the third inclined plane 42 of the fourth body 40 by the elastic force of the elastic member 50, so that the third bodies 30 clamp the drive member 70, and the first body 10 is driven to rotate the drive member 70.

4. When the drive member 70 is inserted into the mounting portion 13 of the first body 10, the drive member 70 directly pushes and moves the third bodies 30 and the second body 20, and the elastic member 50 is compressed, so that the drive member 70 is clamped by the third bodies 30. Thus, the drive member 70 is directly fitted into the mounting portion 13 of the first body 10 and clamped by the third bodies 30 to facilitate the user mounting the drive member 70.

5. When the first body 10 is used to drive the drive member 70, the first body 10 is held by the user's one hand, and the push displacement portion 25 is held by the user's other hand, thereby facilitating the user operating the drive member 70.

6. The drive member 70 is fitted into the mounting portion 13 of the first body 10 easily and smoothly by provision of the second inclined plane 35.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:
1. A hand tool holding structure comprising:
   a first body, a drive member, a second body, multiple third bodies, a fourth body an elastic member, and a fifth body;
   wherein:
   the first body is a circular rod;
   the first body is provided with a first pivot portion;
   the first pivot portion is situated at a mediate position of the first body;
   the first body is provided with a second pivot portion;
   the first body is provided with a mounting portion;
   the mounting portion has a hexagonal shape;
   the second pivot portion has a peripheral face provided with multiple first receiving slots;
   the first receiving slots are connected to the mounting portion;
   each of the first receiving slots is provided with a first abutting edge;

the first abutting edge is situated at an opening of each of the first receiving slots;
each of the first receiving slots is provided with a first end and a second end;
the first end is close to the mounting portion;
the first pivot portion has a diameter more than that of the second pivot portion;
the first body is provided with a second abutting edge located between the first pivot portion and the second pivot portion;
the drive member is mounted in the mounting portion;
the drive member is a hexagonal screwdriver tip;
the second body is pivotally connected with the first body;
the second body is movable on the first body linearly;
the second body has a first end provided with a second receiving slot;
the second receiving slot has a diameter matching that of the second pivot portion;
the first end of the second body is provided with a first abutting portion;
the second body has a second end provided with a third receiving slot;
the third receiving slot has a diameter matching that of the first pivot portion;
the third receiving slot is connected to the second receiving slot;
the second receiving slot and the third receiving slot penetrate the second body;
the diameter of the third receiving slot is more than that of the second receiving slot;
the second body is provided with a second abutting portion located between the second receiving slot and the third receiving slot;
the third bodies have a number matching that of the first receiving slots;
each of the third bodies is movably mounted in one of the first receiving slots;
the third bodies are moved in the first receiving slots simultaneously;
the third bodies are arranged in an annular shape;
each of the third bodies has a first side provided with a locking portion received in one of the first receiving slots;
the locking portions of the third bodies are directed toward each other;
the locking portions of the third bodies are directed toward the mounting portion;
the locking portions of the third bodies are moved toward each other or away from each other when the third bodies are moved;
each of the third bodies has a second side provided with a first inclined plane protruding from one of the first receiving slots;
each of the third bodies is provided with a third end resting on the first end;
each of the third bodies is provided with an abutting face resting on the first abutting portion;
the abutting face is opposite to the third end;
the locking portion is provided with a second inclined plane directed toward the mounting portion;
the second inclined plane and the third end are located at the same side of each of the third bodies;
each of the third bodies is provided with a third abutting portion situated between the locking portion and the first inclined plane;
the third abutting portion rests on the first abutting edge;
the third abutting portion is movable away from the first abutting edge;
the fourth body has a first end provided with a fourth receiving slot mounted on the second pivot portion;
the fourth receiving slot is closely fitted onto the second pivot portion;
the fourth body has a second end provided with a fifth receiving slot mounted on the second body;
the fourth body is provided with a third inclined plane located between the fourth receiving slot and the fifth receiving slot;
the third inclined plane has a slope matching that of the first inclined plane;
when each of the third bodies is moved, the first inclined plane rests on and is moved along the third inclined plane;
the third inclined plane has a minimum diameter more than a diameter of the fourth receiving slot;
the third inclined plane has a diameter increased gradually from the fourth receiving slot toward the fifth receiving slot;
the third inclined plane is connected to the fourth receiving slot and the fifth receiving slot;
the third inclined plane has a maximum diameter equal to a diameter of the fifth receiving slot;
the fourth receiving slot, the third inclined plane, and the fifth receiving slot in turn penetrate the fourth body;
the elastic member is mounted on the second pivot portion and hidden in the third receiving slot;
the elastic member is elastically biased between the second abutting edge and the second abutting portion;
when the second body is pressed by an elastic force of the elastic member, each of the third bodies is pushed the second body, so that the first abutting portion presses the abutting face, the third end presses the first end, and the first inclined plane is close to the third inclined plane;
the fifth body is mounted on the first body; and
the fifth body drives and rotates the first body.

2. The hand tool holding structure as claimed in claim 1, wherein:
each of the first receiving slots has an elongate shape;
the second pivot portion has three first receiving slots arranged in annular shape;
the first abutting edge surrounds each of the first receiving slots;
the first abutting edge has a planar shape; and
each of the first end and the second end has an arcuate shape.

3. The hand tool holding structure as claimed in claim 1, wherein:
the first body is provided with a gear portion;
the gear portion includes multiple teeth arranged in an annular shape;
an interval is defined between the gear portion and the first pivot portion;
the first body is provided with a third abutting edge located between the first pivot portion and the gear portion;
the first body is provided with an annular groove distal to the first pivot portion;
the fifth body has a reversible rotation function and drives the first body to rotate reversibly;
the fifth body includes diverse reversible rotation structures; and
the fifth body is mounted on the gear portion.

4. The hand tool holding structure as claimed in claim 1, wherein;
- the second body has an outer peripheral face provided with a push displacement portion;
- the push displacement portion has an annular toothed shape; and
- the push displacement portion has a diameter more than that of the second body.

5. The hand tool holding structure as claimed in claim 1, wherein the third abutting portion has a planar shape.

6. The hand tool holding structure as claimed in claim 1, wherein the fourth body has a conic cylindrical shape.

7. The hand tool holding structure as claimed in claim 1, wherein:
- when the drive member is inserted into the mounting portion, the second inclined plane is pressed by the drive member, so that each of the third bodies is pushed to move backward;
- the abutting face pushes the first abutting portion, so that the second body is pushed backward, and the elastic member is compressed;
- the first inclined plane is moved along the third inclined plane, the third end is moved away from the first end, the third abutting portion is moved away from the first abutting edge, each of the third bodies is moved toward the second end, and the third bodies are moved away from each other;
- the drive member is fitted into the mounting portion;
- the locking portion is restricted by the elastic force of the elastic member, so that the first inclined plane presses the third inclined plane, and the locking portion is locked onto the drive member;
- the drive member is clamped by the locking portion so that the drive member is secured in the mounting portion;
- the first body is driven by the fifth body to rotate the drive member.

8. The hand tool holding structure as claimed in claim 3, wherein the fifth body is a reversible rotation module comprising a housing, multiple locking pieces, multiple first elastomers, a fixed plate, a control member, a snap-fit plate, a ball, a second elastomer, and a ring;
- the housing is mounted on the first body;
- the locking pieces and the first elastomers are received in the housing;
- the locking pieces are pressed by the elastic force of the first elastomers and locked on the gear portion;
- the locking pieces have a number equal to that of the first elastomers;
- the fixed plate is assembled with the housing;
- the control member is assembled with the housing;
- the control member is rotated to control a normal direction and a reverse direction of rotation of the fifth body;
- the snap-fit plate is snapped onto the third abutting edge;
- the ball and the second elastomer are mounted on the housing; and
- the ring is mounted on the housing and retained in the annular groove.

9. The hand tool holding structure as claimed in claim 1, wherein:
- the first end of the second body is provided with multiple first abutting portions;
- each of the first abutting portions is a recess;
- the first abutting portions have a number equal to that of the third bodies;
- each of the third bodies is partially received in one of the first abutting portions;
- the fifth body and the first body are formed integrally; and
- the fifth body is a hexagonal shank.

10. The hand tool holding structure as claimed in claim 1, wherein the fifth body is a handgrip mounted on the first body.

* * * * *